Aug. 21, 1973     S. ALEWITZ     3,753,888

ANODE FITTING

Filed Nov. 24, 1970

INVENTOR.
SAM ALEWITZ
BY
Fay, Sharpe & Mulholland
ATTORNEYS.

United States Patent Office 3,753,888
Patented Aug. 21, 1973

3,753,888
ANODE FITTING
Sam Alewitz, Painesville, Ohio, assignor to
Perfection Corporation, Madison, Ohio
Continuation-in-part of application Ser. No. 734,940, June 6, 1968, now Patent No. 3,542,663. This application Nov. 24, 1970, Ser. No. 92,355
Int. Cl. C23f 13/00
U.S. Cl. 204—197    6 Claims

ABSTRACT OF THE DISCLOSURE

An anode fitting for use in hot water tanks comprising a connector member adapted to be threadedly received within an opening in the water tank, a tubular intermediate member telescoped within the connector member and attached thereto, and a cylindrical electrode telescoped into the tubular intermediate member and secured thereto. An impervious covering is provided on the external surface of the tubular intermediate member. A perforated covering is provided on the external surface of the electrode.

CROSS-REFERENCE TO RELATED APPLICATION

This application is a continuation-in-part of application Ser. No. 734,940, filed June 6, 1968, now Pat. No. 3,542,663.

BACKGROUND OF THE INVENTION

This invention relates to an improved anode fitting for use in the cathodic protection of metal surfaces such as the internal wall of water heaters, water tanks, pipelines, heat exchangers and the like.

When metals, particularly iron, are exposed to air and water, they undergo corrosion. The corrosion reaction is slow in pure water, but rapid in solutions of electrolytes. The corrosion reaction can be explained as an electrochemical phenomenon. It appears that minute, primary electrical cells are set up when corrosion takes place. When iron is in contact with water containing electrolytes, iron ions immediately go into solution. From a somewhat oversimplified point of view, one may imagine that the attractive forces of the electrolyte molecules exceed the cohesive forces which hold the iron ions in their crystalline lattice. Every positive ion which goes into solution leaves one electron behind for each valence which the ion possesses. These electrons tend to collect at the less active portions of the iron (having a lower electrode potential) and combine with hydrogen ions to form hydrogen gas. Several methods of preventing or retarding corrosion have been proposed including alloying iron with certain other elements such as chromium or silicon and the application of electrochemistry to produce cathodic protection.

This invention relates to electrochemical protection of iron or other metals through cathodic protection. The primary function of this invention is to provide a galvanic anode assembly or fitting adapted to be introduced into a water heater, water tank, pipeline or the like. The fitting includes a metal that is more active than the metal comprising the water heater, water tank, pipeline or the like. The more active metal is electrically connected to the metal to be protected. The difference in activity of the two metals induces a current to flow between them, producing corrosion of the more active metal and furnishing cathodic protection to the iron or less active metal.

Several anode fitting designs have been proposed in the prior art to produce corrosion of an active anode member while furnishing cathodic protection for the less active member. These prior art anode fitting assemblies generally comprise a nipple or a plug member adapted to be threadedly received in the wall of a water heater or the like and an electrode secured to the nipple or plug member. A number of disadvantages of the prior art anode fittings of this type have been observed. A significant disadvantage is the fact that the anode tends to erode at the area of joinder of the anode and the nipple or plug with the result that after a short period of time the anode metal closest to the fitting necks down and is eventually consumed in providing protection for the nipple or plug holder. This is due to the fact that a bare anode seems to provide most protection for the bare metal nearest to it.

Another significant disadvantage of prior art anodes of the type described is that consumption of the anode is at such a rate that a relatively large amount of anode material must be provided in order to provide a reasonable life for the assembly.

In application Ser. No. 734,940 filed June 6, 1968, now Pat. No. 3,542,663, an anode structure is described which provides for an improved joint structure between the electrode and the fitting of the anode structure. The improved structure as described in application Ser. No. 734,940 reduces corrosion of the electrode at the fitting thus greatly extending the life of the assembly itself.

This application is an improvement over the structure of application Ser. No. 734,940 in that it provides for a sheath structure at the electrode of the assembly with cooperation between the sheath structure and the impervious covering means at the fitting.

BRIEF DESCRIPTION OF THE INVENTION

Briefly described, this invention provides an anode fitting to protect the metallic surface of a water heater, water tank or the like. The fitting comprises a connector member adapted to be secured to such metallic surface in electrical contact therewith. A tubular intermediate member is secured to the connector member in electrical contact therewith. An electrode comprised of metal that is higher in the electrochemical series than the metal defining the metallic surface to be protected is secured to the tubular intermediate member in electrical contact therewith. The entire external surface of the tubular intermediate member is covered by an impervious material in order to render the tubular intermediate member electrically inert to electrolytes while functioning to physically separate and insulate the external surface of the electrode from the external surface of the connector member. The electrode itself is covered by a perforated impervious material which is joined to the impervious covering of the tubular intermediate member.

In the preferred embodiment of the invention, the connector member is comprised of a hollow nipple telescoped about the tubular intermediate member and secured thereto in electrical contact as by rolling the members together thereby producing an inwardly directed rib or corrugation. The electrode is a generally cylindrical member and, in one embodiment, includes a core wire which is electrically connected to the tubular intermediate member. The electrode is telescoped within a portion of the tubular intermediate member and is operatively connected thereto as by rolling the tubular intermediate member about the electrode. An insulating sleeve is disposed between the electrode and the tubular intermediate member to prevent electrical contact at the joint, establish a seal at the joint and insure a tight mechanical joining of the members. The perforated covering of the electrode is in the form of a generally cylindrical sleeve received about the external surface of the electrode and joined to the covering of the tubular intermediate member.

When it is desired to use the fitting of this invention as a combination anode and water outlet for a water heater, or when it is desired to use the fitting in combination with a relief valve, an impervious non-metallic waterway is defined within the connector member and the tubular intermediate member. A transverse passageway is defined in the tubular intermediate member to provide for the passage of fluid from the interior of the water heater to an outlet line or relief valve connected to the connector member. The fluid passageways in the respective connector member and the tubular intermediate member are rendered impervious to fluid by lining the walls defining the passageways with inert material.

DESCRIPTION OF THE INVENTION

A more complete description of the invention will now be made with reference to the attached drawings in which.

THE INVENTION DESCRIBED

Figure 1:
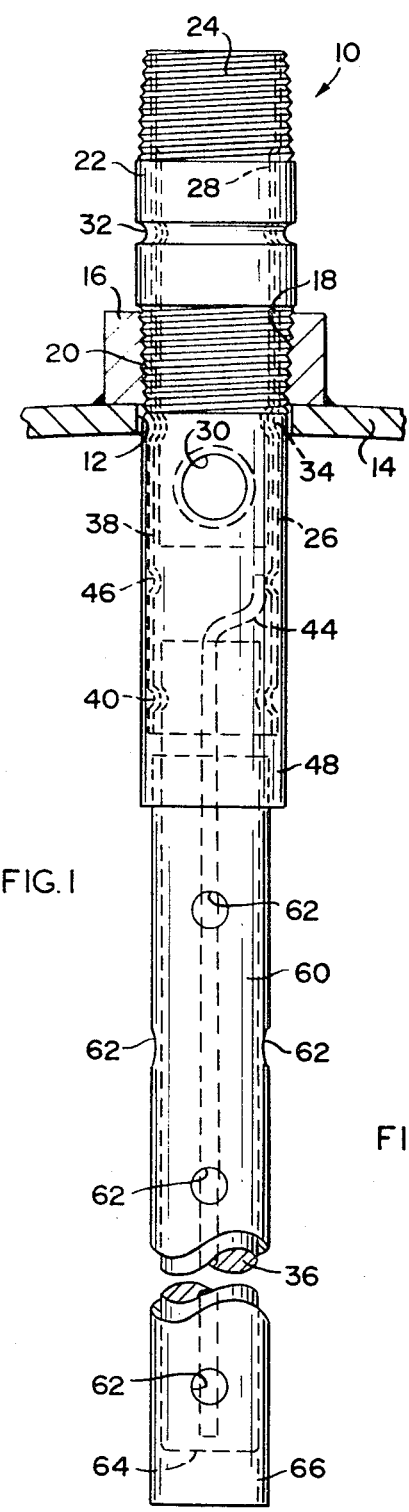
FIG. 1 is an elevational view partly in section and partly in phantom of the preferred embodiment of the anode fitting of this invention secured to the top wall of a water heater.

There is shown in FIG. 1 an anode fitting assembly 10 according to this invention received within an opening 12 defined within the top wall 14 of a water heater, heat exchanger, pipeline, hot water tank or the like. A spud 16 is welded or otherwise secured to the top wall 14 so as to overlie the opening 12. Internal threads 18 in the spud are adapted to cooperate with external threads 20 of the connector member 22 in order to provide support for the anode fitting. In the preferred embodiment, the end of the connector member 22 opposite threads 20 (i.e. the outer end of the connector member 22) is provided with external threads 24 for attachment to a water line or for alternate purposes to be described more fully hereafter.

The threaded connection between the connector member 22 and the spud 16 of the top wall 14 as shown in FIG. 1 is the commerically acceptable manner of securing a fitting to a water heater. Within the scope of this invention, however, should be considered alternate structures for connecting the connector member 22 to the top wall 14 including weldments, sweat fittings and the like. Alternately, the connector member 22 could be threaded directly into the top wall 14.

Figure 3:
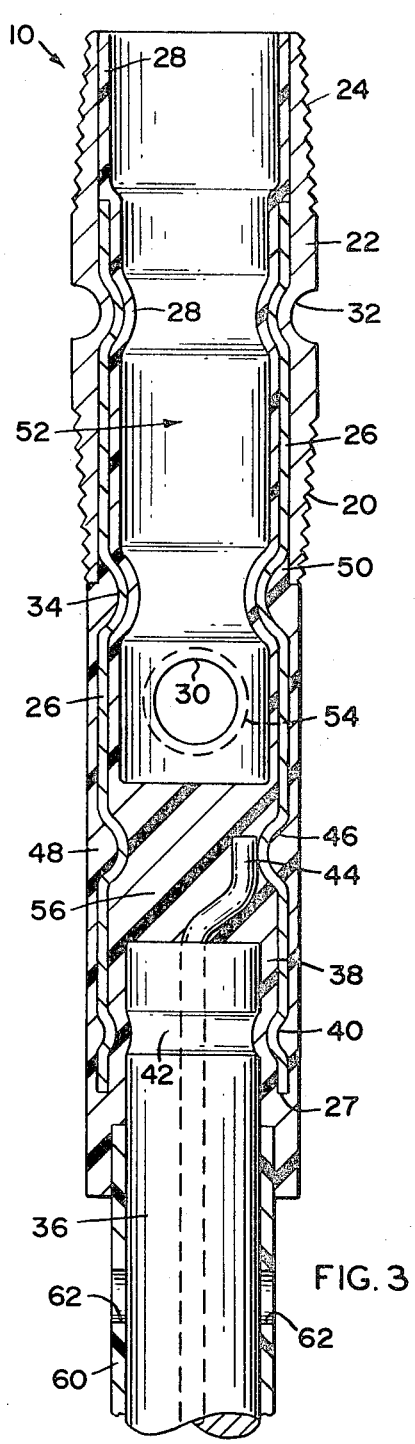
FIG. 3 is an elevational sectional view of the preferred embodiment of the anode fitting of this invention.

In FIG. 3, there is shown a cross-sectional view of the preferred embodiment of the anode fitting of this invention. Connector member 22 is defined more specifically as a hollow nipple member including external threads 20 at the inner end thereof and external threads 24 at the outer end thereof. A tubular intermediate member 26 is disposed coaxial with connector member 22 and is partially telescoped within the inner end of the connector member 22. A lining 28 is provided within the tubular intermediate member 26 and extends from a position flush with the outer end of the connector member 22 well within the tubular intermediate member 26 to a point below the transverse opening 30 as will be more fully described hereafter. As will be observed from FIG. 3, the lining 28 generally follows the internal contour of the tubular intermediate member 26 and the connector member 22.

The connector member 22 and the tubular intermediate member 26 are firmly locked together in electrical contact by rolling these respective members together by means of a die thus to distort or displace the metal of the connector member 22 thereby to produce an inwardly extending annular rib or corrugation 32. Tubular intermediate member 26 is similarly indented. For a more complete description of the roll die means producing the annular rib 32 reference is made to the Jacobson Pat. No. 3,093,161. Other means of securing members 22, 26 together in electrical contact should be considered within the spirit of this invention.

A similar indentation or annular rib 34 is defined in the tubular intermediate member 26 at a position slightly below the inner end of the connector member 22 for a purpose to be described more fully hereafter.

An electrode 36 is telescoped within the tubular intermediate member 26. The tubular intermediate member is operatively secured to the electrode as by rolling the members together with a suitable die thus to distort or displace the metal of the tubular intermediate member thereby to form a rib 40. A slight indentation 42 will be made in the external surface of the electrode 36 thus insuring that the electrode 36 will be rigidly retained within the tubular intermediate member 26. It should be noted that in the embodiment of FIG. 3 the rib 40 does not make electrical contact with the external surface of the electrode 36 due to the insulating sleeve 38 disposed therebetween. Sleeve 38 also acts as a seal to prevent entry of fluid into the interior of the tubular intermediate member 26.

Electrical contact between electrode 36 and the tubular intermediate member 26 is provided by means of a core wire 44 extending from the electrode and fused, spot welded or otherwise suitably secured to annular rib 46 of the tubular intermediate member 26. Although in the embodiment of FIG. 3 the rib 46 is annular in configuration (being defined by a rolling operation of a die against the external surface of the tubular intermediate member), any suitable connection between core wire 44 and the tubular intermediate member 26 should be considered within the scope of this invention. As an example, a tine could be struck from the tubular intermediate member and brought into contact with the core wire. Alternatively, a pocket could be struck from the tubular intermediate member 26 as by lancing the member 26 and thereafter the core wire received within and secured to the wall defining such pocket.

As shown in FIG. 3 a perforated sheath 60 is disposed about the external surface of electrode 36. Sheath 60 is essentially tubular in configuration being provided with a plurality of perforations or openings 62 as will be described more fully hereafter.

Figure 2:
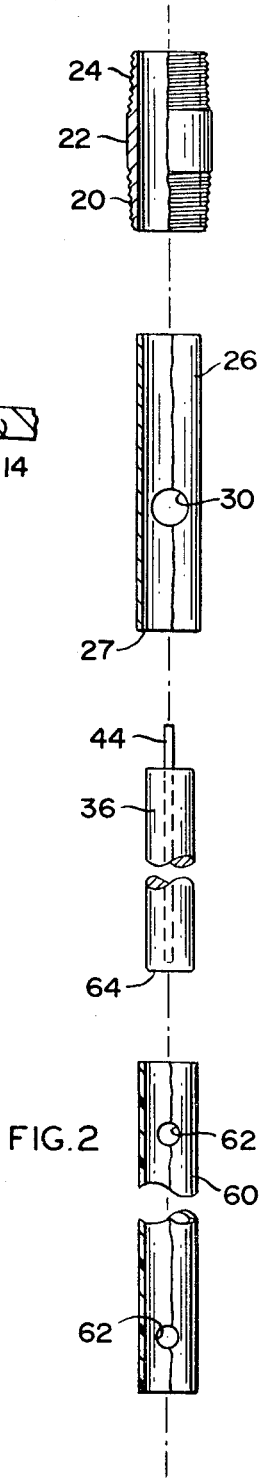
FIG. 2 is an exploded view of the several parts comprising the preferred embodiment of the anode fitting of this invention.

In FIG. 2, there is shown an exploded view of the various elements comprising the embodiment of FIG. 3 prior to molding of the fitting.

Attention is now directed to the exterior surface of the tubular intermediate member 26 wherein a non-metallic impervious covering 48 is provided for the purpose of rendering the external surface of the tubular intermediate member 26 impervious to electrolytic fluid thus retarding or prohibiting altogether corrosion of the tubular intermediate member 26. To this end, a casting is made about the external surface of the tubular intermediate member 26 thereby defining a generally annular impervious covering 48. From FIG. 3 it will be noted that covering 48 fills the indentations defined by the annular ribs 34, 46 and 40. Covering 48 extends below the end wall 27 of the tubular intermediate member 26 and, as will be observed in FIG. 3, extends between the members 26, 36 to define sleeve 38. Covering 48 also comes into contact with the external surface of the perforated sheath 60 of the electrode thereby completely sealing the end wall 27 of the tubular intermediate member 26 from electrolytic fluid. Thus, the entire electrode end is sealed from electrolytic fluid.

Covering 48 extends upwardly, as shown in FIG. 3, into contact with the connector member 22 where the indentation defined by the rib 34 permits a small mount of material to collect behind the connector member 22 as flash 50. It has been found that by providing a slight amount of flash 50 behind the inner end of the connector member 22, a seal is thus defined at the inner end of the connector member 22 preventing entry of electrolytic fluid at the interface of members 22 and 26, thus preventing localized corrosion at the area of joinder of the connector and the tubular intermediate member. This seal is particularly enhanced by the taper of the pipe threads 20 of connector member 22 which taper causes the threads to be squeezed radially inwardly into flash 50.

In the embodiment of FIG. 3 a transverse opening 30 is defined in the tubular intermediate member 26 for the purpose of permitting entry of water from the hot water tank into the passageway 52 (defined within connector member 22 and the tubular intermediate member 26) and thereafter to a suitable discharge pipeline (not shown). Depending upon the volume of discharge required, one or several transverse openings 30 may be defined in the tubular intermediate member 26. At the same time that the covering 48 is cast in place, a core is inserted in the passageway 52 and the transverse opening 30 in order to permit a small amount of material to flow about the wall defining the opening 30 thus providing overlapping insulation 54 to cover the metallic walls defining the transverse opening 30. At the same time lining 28 and bottom wall 56 are cast in place. Thus, the tubular intermediate member is rendered completely impervious to electrolytic action. Bottom wall 56 completely covers core wire 44 and the spot welded connection of the core wire and the annular rib 46. Bottom wall 56 and lining 28 thus cooperate to define an impervious interior passageway within the tubular intermediate member 26 and the connector member 22 providing for the flow of fluid from the water tank.

Attention will now be directed to the perforated sheath 60 covering a substantial portion of the external surface of the electrode 36. In the preferred embodiment, sheath 60 is in the form of a generally tubular sleeve having a plurality of perforations 62 in the wall thereof. The number of perforations may vary to suit individual requirements although, in the preferred embodiment, sufficient perforations are provided in the sleeve to expose as little as 5% of the surface of the electrode. The perforations may be placed in the sleeve either by being formed by a punch or other similar instrument prior to telescoping of the sheath over the electrode or, in the alternative, may be formed after assembly with the electrode by a punch or drill.

It has been found through testing and evaluation that the perforated sheath surrounding the electrode greatly diminishes the consumption of the electrode. At the same time, however, it has been observed that there is no appreciable reduction in the EMF generated by the fitting assembly. As a result a smaller mass of electrode may be used in the anode fitting assembly than would ordinarily be required when a bare electrode is used. Manufacturing costs of the anode fitting assembly are thus reduced since material costs are reduced.

Several significant features of the preferred embodiment of the anode fitting as shown in FIG. 3 should be emphasized at this time. The electrode 36 is not connected directly to the connector member 22. Rather, a tubular intermediate member 26 is disposed between the connector member 22 and the electrode 36.

The tubular intermediate member serves two important functions:

(1) The tubular intermediate member 26 physically separates and insulates the external surface of the electrode 36 from the external surface of the connector member 22. This separation is enhanced by an impervious covering 48 rendering the external surface of the tubular intermediate member 26 impervious to electrolytic action. Other elements of the fitting are similarly rendered impervious to electrolytic action.

(a) The electrical connection between the electrode 36 and the connector member 22 is entirely out of contact with the electrolytic solution of the water tank. The core wire 44 and the spot weld connection at annular rib 46 are completely sealed within bottom wall 56.

(b) The joining of the connector member 22 and the tubular intermediate member 26 at annular rib 32 is well above the liquid level of the water within the water heater. Furthermore, flash 50 serves to seal the interface of the members 22 and 26.

(c) The internal passageway 52 is rendered impervious to electrolytic action through the cooperation of the lining 28 and the bottom wall 56.

(2) The tubular intermediate member 26 serves as a convenient conduit for the flow of fluid from the water heater in the event that it is desired to utilize the anode fitting of this invention in combination with either an outlet for a water heater and/or a relief valve.

The perforated sheath 60 serves two important functions:

(1) In exposing as little as 5% of the surface area of the electrode to the electrolytic solution of the water tank, the perforated sheath greatly reduces the consumption of the electrode without signaficantly decreasing the EMF generated by the anode fitting. The result is a greatly extended electrode life and a reduction of the electrode material requirements of the fitting.

(2) The perforated sheath further cooperates with the impervious covering 48 to provide for improved sealing of the fitting in the vicinity of the joint between the electrode and the tubular intermediate member 26. Thus, the fitting itself and much of the electrode are completely encased in a fluid impervious covering. The overall integrity of the fitting assembly is thus greatly enhanced providing for longer life and more dependable performance of the anode.

As will be observed from an examination of FIG. 1, the perforated sheath extends slightly past the bottommost end of the electrode thus defining a small annular lip 66. The bottom face 64 of the electrode is thus exposed to electrolytic fluid.

It should be emphasized that whereas the embodiment of FIG. 3 is directed to a combination anode fitting and water outlet this invention in its broadest form is directed to an anode fitting wherein an intermediate member is utilized to substantially separate the electrode from the water heater connector member; the external surface of the intermediate member and the external surface of the electrode including an impervious covering. While it is considered convenient to utilize the intermediate member as a fluid passageway as is shown in FIG. 3, this invention should not be considered limited to a fluid passageway in combination with an anode fitting.

The choice of material of the various elements comprising the anode fitting of this invention may vary depending upon particular requirements. Since water heaters, water tanks and pipelines are usually constructed of ferrous metal, the electrode material may be selected from a group including but not limited to more active electrochemical metals such as magnesium, aluminum and zinc. Similarly, core wire 44, if present, may be manufactured of several metals with steel being preferred. The tubular intermediate member 26 of the preferred embodiment is fabricated from steel although other metals may be used. Similarly, the connector member 22 may be fabricated from one of several metals with brass or steel being preferred. The particular choice of material in each case will depend upon many factors including the characteristic of the metal to be protected. Since water heaters and water tanks are generally fabricated from steel sheet, it is preferred that the connector member 22, tubular intermediate member 26 and core wire 44 be similarly fabricated from steel. The lining 28, sleeve 38, covering 48, bottom wall 56 and perforated sheath 60 may be fabricated from any suitable impervious material such as polypropylene. In the preferred embodiment, polypropylene compound No. 6652 of Hercules, Incorporated is used. This compound tends to shrink inwardly when applied as an external covering thus to enhance sealing of the metal surfaces against electrolytic fluids. Other materials such as epoxy resins, Bakelite, or formaldehyde compounds may be used.

MODIFICATIONS AND EXTENSIONS OF THE INVENTION

Several modifications and extensions of the invention will now be described.

As an alternate embodiment of the anode fitting of this invention, the electrode 36 may be secured within the tubular intermediate member 26 in direct electrical contact therewith. Thus, the sleeve 38 may be eliminated and the annular rib 40 rolled into direct engagement with the external surface of the electrode 36 to firmly lock these members together in physical and electrical contact. The particular choice as to the mode of connection of the electrode and the tubular intermediate member will depend upon many factors including the selection of an electrode with or without a core wire. The core wire 44 of FIG. 3 has the advantage of providing structural support for the electrode as advanced corrosion of the electrode takes place.

Other structures for connecting the electrode to the tubular intermediate member well known to those skilled in the art should equally be considered within the scope of this invention. For instance, the electrode could be screw threadedly received within the tubular intermediate member or locked in place as by means of a bayonet joint. Various fastening elements such as rivets might be considered desirable for securing the electrode within the tubular intermediate member.

Whatever the mode of connection of the electrode and the tubular intermediate member, it is considered desirable to extend the impervious covering 48 around the bottommost portion of the tubular intermediate member into contact with the sheath 60 in order to preclude entry of electrolyte into the joint area.

The anode fitting as shown in FIG. 3 combines the electrode with a hot water outlet. Thus by connecting a hot water discharge line to the connector member 22 at the external threads 24 it is possible to completely eliminate the necessity for a separate anode fitting and hot water outlet in a water heater.

In alternate embodiments a pressure and temperature relief valve may be secured to the connector member 22 with an overflow line extending from such valve.

Depending upon plumbing code requirements, it may be possible to combine the electrode, hot water outlet, and temperature and pressure relief valve (with overflow line) in a single anode fitting.

As a practical matter, some water heaters may be sold without the various accessories in the top wall thereof such as relief valves, nipples, etc. It is virtually impossible to manufacture a water heater to be sold nationally that will meet all of the various local codes. For this reason, it may be desirable to manufacture and sell the anode fitting of this invention with a single cover member received on the connector member 22.

While in the preferred embodiment of the invention the electrode is covered by a sheath 60 in the form of a generally cylindrical perforated sleeve member adapted to be disposed about the electrode, other sheath structures should be considered within the spirit of the invention including but not limited to coverings cast or applied directly to the electrode by means well known to those skilled in the art.

While the preferred embodiment of the invention as shown in FIG. 1 provides for exposure of the bottommost face 64 of the electrode, it should be understood that in alternate embodiments the sheath could extend across such face in order to enclose the end of the electrode.

SUMMARY OF THE INVENTION

The anode fitting of this invention has been provided to overcome many of the problems presented by prior art anode fittings. The structure of the anode fitting of this invention provides for complete isolation of the electrode material from the connector member supporting the electrode in the water heater. With the exception of an electrical contact between the members, the electrode is otherwise insulated from the connector member. Thus, localized interaction between the electrode and the connector member, characteristics of prior art anode fittings, has been eliminated. Through the medium of a tubular intermediate member the external surface of which is rendered impervious to electrolytic fluid, the electrode itself is the only element of the fitting substantially emersed in electrolytic fluid. The provision of a perforated sheath, however, limits the exposure of the electrode to approximately 5% of its surface area. The cooperation of the electrode sheath and the impervious coating on the tubular intermediate member, characteristic of prior art anode fittings, has been anode assembly as well as the upper end of the electrode itself. Local interaction and corrosion of the upper portion of the electrode is thus prevented.

The invention claimed is:

1. An anode fitting for protecting a metallic surface such as is found in a water heater or the like from corrosion induced by a liquid, said fitting comprising;

a connector member adapted to be secured to such metallic surface in electrical contact therewith;

means to isolate said connector member from direct contact with such liquid;

said connector member being defined by a hollow nipple having an inner end adapted to be operatively secured to such metallic surface and in communication with an opening in such metallic surface and an outer end having a cover member thereon;

a coaxial tubular intermediate member defined by a hollow sleeve extending from said connector member;

a coaxial electrode comprised of a metal that is higher in the electrochemical series than the metal defining such metallic surface, said electrode having one end disposed within said tubular intermediate member and axially spaced from the inner end of said connector member;

means to secure said electrode to said tubular intermediate member in electrical contact therewith;

impervious covering means on the external surface of said tubular intermediate member;

perforated impervious covering means on the external surface of said electrode and having one end thereof disposed within said impervious covering means of said tubular intermediate member and in contact therewith;

whereby said tubular intermediate member is impervious to such liquid and functions to axially separate said electrode which is immersed in such liquid from said connector member which is isolated from such liquid and the contact of said impervious covering means of said tubular intermediate member and said perforated impervious covering means of said electrode provides for sealing at the area of joinder of said electrode and said tubular intermediate member.

2. The invention of claim 1 in which said intermediate member is disposed within said connector member.

3. The invention of claim 1 in which said electrode is defined by an elongated cylindrical member.

4. The invention of claim 1 in which said perforated covering means is a generally cylindrical perforated sleeve received about the exterior surface of said electrode.

5. An anode fitting for a water heater or the like comprising:
   a connector member adapted to be secured to a wall of such water heater in electrical contact therewith and having means at its outer end for the attachment of a water line;
   a first fluid passageway in said connector member;
   an intermediate member secured to said connector member in electrical contact therewith;
   a second fluid passageway in said intermediate member in communication with said first fluid passageway;
   an electrode secured to said intermediate member in electrical contact therewith;
   a third fluid passageway providing communication from the exterior surface of said intermediate member to said second fluid passageway;
   lining means in said first, second and third passageways rendering said passageways impervious to fluid;
   covering means on the exterior surface of said tubular intermediate member rendering said intermediate member impervious to fluid;
   perforated impervious covering means on the external surface of said electrode and having one end disposed within said covering means of said tubular intermediate member and in close fluid tight contact therewith.

6. The invention of claim 5 in which said covering means of said tubular intermediate member and said perforated impervious covering means of said electrode are of plastic material.

References Cited
UNITED STATES PATENTS

| | | | |
|---|---|---|---|
| 2,652,358 | 9/1953 | McFerran | 204—197 |
| 2,656,314 | 10/1953 | Osterheld | 204—197 |
| 2,808,373 | 10/1957 | Andrus | 204—196 |
| 2,855,358 | 10/1958 | Douglas | 204—197 |
| 3,012,958 | 12/1961 | Vixler | 204—197 |
| 3,542,663 | 11/1970 | Alewitz | 204—197 |

TA-HSUNG TUNG, Primary Examiner